United States Patent
Bour et al.

(10) Patent No.: US 7,142,342 B2
(45) Date of Patent: Nov. 28, 2006

(54) ELECTROABSORPTION MODULATOR

(75) Inventors: David P. Bour, Cupertino, CA (US);
Ashish Tandon, Sunnyvale, CA (US);
Scott W. Corzine, Sunnyvale, CA (US);
Chaokun Lin, Fremont, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 93 days.

(21) Appl. No.: 10/453,376

(22) Filed: Jun. 2, 2003

(65) Prior Publication Data

US 2004/0240025 A1 Dec. 2, 2004

(51) Int. Cl.
*G02F 1/03* (2006.01)
*G02F 1/07* (2006.01)

(52) U.S. Cl. .................. 359/244; 359/237; 359/245; 359/315; 359/316

(58) Field of Classification Search ............. 359/241, 359/237, 244, 245, 240, 248, 247, 290, 291, 359/292, 298, 315, 316
See application file for complete search history.

(56) References Cited

U.S. PATENT DOCUMENTS

| | | | |
|---|---|---|---|
| 5,297,158 A * | 3/1994 | Naitou et al. | 372/46 |
| 6,317,444 B1 * | 11/2001 | Chakrabarti et al. | 372/45 |
| 6,664,605 B1 * | 12/2003 | Akulova et al. | 257/432 |
| 2003/0042476 A1 * | 3/2003 | Nakahara et al. | 257/10 |
| 2003/0146440 A1 * | 8/2003 | Murata et al. | 257/79 |

* cited by examiner

*Primary Examiner*—Alicia M. Harrington
*Assistant Examiner*—Brandi Thomas (57) ABSTRACT

The electroabsorption modulator comprises a p-i-n junction structure that includes an active layer, a p-type cladding layer and an n-type cladding layer with the active layer sandwiched between the cladding layers. The electroabsorption modulator additionally comprises a quantum well structure located within the active layer. The p-type cladding layer comprises a layer of heavily-doped low-diffusivity p-type semiconductor material located adjacent the active layer that reduces the extension of the depletion region into the p-type cladding layer when a reverse bias is applied to the electroabsorption modulator. The reduced extension increases the strength of the electric field applied to the quantum well structure by a given reverse bias voltage. The increased field strength increases the extinction ratio of the electroabsorption modulator.

21 Claims, 3 Drawing Sheets

ELECTROABSORPTION MODULATOR

BACKGROUND OF THE INVENTION

Electroabsorption modulators have been widely used to modulate light in optical communications and other applications. For example, an electroabsorption modulator can modulate the light generated by a light source, such as a continuous light source. The electroabsorption modulator modulates light by either allowing or preventing incident light to pass through the electroabsorption modulator. The modulated light output from the electroabsorption modulator has an ON state and an OFF state. In the ON state, the light passes through the electroabsorption modulator and is emitted from the output of the electroabsorption modulator. In the OFF state, the light is absorbed by the electroabsorption modulator, and no light is emitted at the output of the electroabsorption modulator. As used in this disclosure, the term light means electromagnetic radiation ranging in wavelength from short ultra-violet to long infra-red.

One type of electroabsorption modulator includes a p-i-n junction structure composed of an active layer of intrinsic semiconductor material (intrinsic layer) sandwiched between a cladding layer of p-type semiconductor material (p-type cladding layer) and a cladding layer of n-type semiconductor material (n-type cladding layer). This type of electroabsorption modulator modulates the light by switching between a transmissive mode and an absorptive mode. In the transmissive mode, the band gap of the semiconductor material of the active layer is greater than the photon energy of the light. The photons of the light therefore have insufficient energy to generate electron-hole pairs in the active layer, and absorption of the light by the active layer is negligible. Consequently, light from the light source passes through the active layer and is output by the electroabsorption modulator. In the transmissive mode of the electroabsorption modulator, the modulated light is in its ON state.

In the absorptive mode of the electroabsorption modulator, the band gap of the material of the active layer is effectively reduced below the photon energy of the light. The photons of the light now have sufficient energy to generate electron-hole pairs in the semiconductor material of the active layer. As a result, absorption of the light by the semiconductor material of the active layer is substantial. When sufficient electron-hole pairs are generated, all of the light is absorbed in the active layer, and none of the light passes through the active layer and is output by the electroabsorption modulator. In the transmissive mode of the electroabsorption modulator, the modulated light is in its OFF state.

Two of the main parameters that characterize the light modulation performance of an electroabsorption modulator are extinction ratio and speed of modulation. The extinction ratio is the ratio of the maximum optical power output by the electroabsorption modulator to the minimum optical power output by the electroabsorption modulator. A higher extinction ratio is typically the result of a higher absorption of the light through the creation of more electron-hole pairs in the active layer. Speed of modulation indicates the time required for the electroabsorption modulator to modulate the light from the ON state to the OFF state. Electroabsorption modulators with high extinction ratios and high speeds of modulation are typically desired.

The active layer of an electroabsorption modulator is typically structured to include a quantum well structure that defines one or more quantum wells. Light is absorbed in the active layer of the electroabsorption modulator when an electric field is applied to the quantum wells in a direction orthogonal to the layers of the quantum well structure. Applying the electric field changes the effective band gap energy of the quantum well structure through the quantum-confined Stark effect.

Electroabsorption modulators absorb incident light when a reverse bias is applied to the p-i-n junction structure. Because a negligible current flows when the reverse bias is applied, the speed of modulation of the electroabsorption modulator is limited by the time taken to apply the reverse-bias voltage. Consequently, the speed of modulation of the electroabsorption modulator is limited by the capacitance of the electroabsorption modulator and the resistance and inductance of the circuitry that supplies the reverse bias voltage to the electroabsorption modulator.

In conventional electroabsorption modulators, a tradeoff has to be made between the extinction ratio and the speed of modulation. High-speed operation of the electroabsorption modulator requires that the p-i-n junction structure have a very low capacitance. To reduce the capacitance, the thickness of the active layer is increased, to about 300 nanometers, for example. However, increasing the thickness of the intrinsic layer reduces the extinction ratio, which is typically undesirable. The extinction ratio is reduced because the strength of the electric field applied across the quantum wells is reduced as a result of a given reverse bias voltage being dropped across a thicker intrinsic layer. As a result, the quantum-confined Stark shift and the light absorption are both reduced. Consequently, a low-capacitance electroabsorption modulator requires an increased reverse bias voltage to achieve a desired extinction ratio.

However, increasing the reverse bias voltage increases the width of the depletion region that exists in the p-i-n junction structure when the reverse bias voltage is applied. The depletion region exists in the active layer and additionally extends into the cladding layers. The p-type and n-type cladding layers are typically heavily doped to reduce the extent to which the depletion region extends into them with the purpose of reducing the effective width of the depletion region. However, the extent to which there is extension of the depletion region into the cladding layers reduces the strength of electric field across the quantum wells of the electroabsorption modulator and, hence, reduces the extinction ratio of the electroabsorption modulator. Moreover, the need for a higher reverse bias voltage to achieve a desired extinction ratio conflicts with the current trend in high-speed drive circuit design, which is towards lower supply voltages and, hence, lower voltage swings.

SUMMARY OF THE INVENTION

In one aspect, the invention provides an electroabsorption modulator that comprises a p-i-n junction structure that includes an active layer, a p-type cladding layer and an n-type cladding layer with the active layer sandwiched between the cladding layers. The electroabsorption modulator additionally comprises a quantum well structure located within the active layer. The p-type cladding layer comprises a layer of heavily-doped low-diffusivity p-type semiconductor material located adjacent the active layer.

In another aspect, the invention provides an electroabsorption modulation system that comprises an electroabsorption modulator, a light source and a waveguide arranged to couple light from the light source to the electroabsorption modulator. The electroabsorption modulator comprises a p-i-n junction structure that includes a p-type cladding layer, an n-type cladding layer and an active layer sandwiched between them. The p-type cladding layer comprises a layer of heavily-doped low-diffusivity p-type semiconductor material located adjacent the active region.

The heavily-doped low-diffusivity p-type semiconductor material is stably doped with a high level of an acceptor impurity. The high doping concentration that can be stably attained in the layer of heavily-doped low-diffusivity p-type semiconductor material reduces the extension of the depletion region into the p-type cladding layer compared to that which occurs in a conventional p-type cladding layer of InP doped with zinc at its highest stably attainable doping concentration. The reduced extension of the depletion region into the p-type cladding layer increases the strength of the electric field applied to the quantum well structure by a given reverse bias voltage. The increased field strength increases the extinction ratio of the electroabsorption modulator.

DETAILED DESCRIPTION OF THE INVENTION

Figure 1:
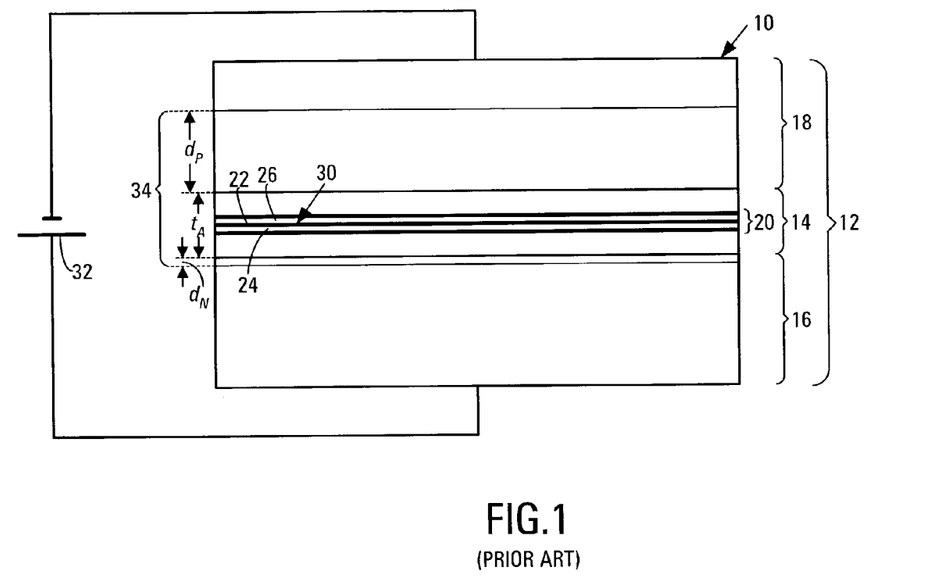
FIG. 1 is a schematic diagram of a conventional electroabsorption modulator in accordance with the prior art.

FIG. 1 is a schematic diagram illustrating an example of a conventional electroabsorption modulator. The electroabsorption modulator 10 is composed of a p-i-n junction structure 12. The p-i-n junction structure is composed of an active layer 14 sandwiched between an n-type cladding layer 16 and a p-type cladding layer 18.

N-type cladding layer 16 is doped with a donor (n-type) dopant. P-type cladding layer 18 is doped with an acceptor (p-type) dopant. No dopant is added to the semiconductor material of active layer 14 during fabrication of the active layer. Such semiconductor material is conventionally called undoped or intrinsic in the art, but is typically n-type with a donor concentration below about $10^{16}$ atoms cm$^{-3}$.

Located at approximately the mid-point of the thickness of active layer 14 is a quantum well structure 20. The quantum well structure is composed of N quantum well layers of a semiconductor material having a relatively low band gap energy. N is an integer greater than or equal to unity. The quantum well layers are interleaved with N+1 barrier layers of a semiconductor material having a band-gap energy higher than that of the semiconductor material of the quantum well layers. An exemplary quantum well layer is shown at 22. Exemplary barrier layers between which quantum well layer 22 is located are shown at 24 and 26. The layers of the quantum well structure are typically only a few nanometers thick. The outermost barrier layers may be thicker. A quantum well exists at each quantum well layer. The quantum well collectively defined by the quantum well layer 22 and the barrier layers 24 and 26 is shown at 30.

The quantum wells defined by quantum well structure 20 are structured to absorb light of a defined wavelength when the p-i-n junction structure 12 of electroabsorption modulator 10 is reverse biased by a reverse bias voltage applied by a voltage source 32. The photons of the light have sufficient energy to create bound electron-hole pairs called excitons in the quantum well and are therefore absorbed, as will be described more fully below.

When no reverse bias voltage is applied to electroabsorption modulator 10, a depletion region 34 exists in p-i-n junction structure 12, principally in the portion of active layer 14 adjacent p-type cladding layer 18. The depletion region additionally extends into a thin region of the p-type cladding layer adjacent the active layer. The thickness of the depletion region increases when the voltage source 32 applies a reverse bias voltage to electroabsorption modulator 10. At a low reverse bias voltage, the depletion region remains principally in active region 14. As the reverse bias voltage is increased, the thickness of the depletion region increases until the depletion region fills the entire active region. The thickness of the active region is indicated by $t_A$. Increasing the reverse bias voltage also causes the depletion region to extend further into p-type cladding layer 18. A further increase in the reverse bias voltage causes depletion region 34 to extend even further into p-type cladding layer 18 and additionally to extend into n-type cladding layer 16, as shown in FIG. 1. The distances $d_N$ and $d_P$ indicate the distances by which depletion region 34 extends into n-type cladding layer 16 and p-type cladding layer 18, respectively, at a typical operating reverse bias voltage applied to electroabsorption modulator 10. The distances $d_N$ and $d_P$ depend on the reverse bias voltage applied across p-i-n junction structure 12 and on the doping levels of n-type cladding layer 16 and p-type cladding layer 18, respectively.

In typical embodiments of the conventional electroabsorption modulator 10, the material of n-type cladding layer 16 and p-type cladding layer 18 of p-i-n junction structure 12 is indium phosphide (InP), and the materials of the layers constituting active layer 14 are various formulations of indium gallium arsenide phosphide (InGaAsP).

The InP of n-type cladding layer 16 is doped with silicon. The InP of p-type cladding layer 18 is typically doped with zinc. As noted above, the semiconductor materials of the cladding layers are doped at as high a doping level as possible to minimize the extension of depletion region 34 into the cladding layers when the electroabsorption modulator is reverse biased. InP can be doped with silicon at a high doping level, typically about $1\times10^{19}$ atoms cm$^{-3}$. Such highly doped n-type InP is stable, i.e., diffusion of the silicon dopant from the n-type cladding layer to active layer 14 is minimal. The presence of dopant in the active layer is undesirable in an electroabsorption modulator. In p-type cladding layer 18, however, zinc has a high diffusivity, and tends to diffuse from the p-type cladding layer into the active layer. To minimize out-diffusion of the zinc dopant, the concentration of the zinc dopant in the p-type cladding layer is typically no more than about $1\times10^{18}$ atoms cm$^3$.

At the maximum stable doping concentration of zinc in the InP of p-type cladding layer 18, the extension $d_P$ of depletion region 34 into the p-type cladding layer is substantially greater than the extension $d_N$ of the depletion region into n-type cladding layer 16. The extension of the depletion region into the n-type cladding layer is relatively small due to the high doping concentration attainable with silicon in InP. Moreover, the rate at which the depletion region extends with increasing reverse bias voltage is significantly greater in the p-type cladding layer than in the n-type cladding layer. The extension of the depletion region into the p-type cladding layer reduces the strength of the electric field applied by a given reverse bias voltage across the quantum wells 30. The reduction in the strength of the electric field reduces the extinction ratio of the electroabsorption modulator. Consequently, electroabsorption modulator 10 may have an extinction ratio that is unacceptably low for use in many applications.

Embodiments of the invention provide an electroabsorption modulator in which the p-type cladding layer includes a layer of low-diffusivity p-type semiconductor material adjacent the active layer. This material is low diffusivity in the sense that it can be doped with an acceptor dopant at a substantially higher doping concentration than zinc-doped InP before out-diffusion of the acceptor dopant becomes a concern. The low-diffusivity p-type semiconductor material can be doped with an acceptor dopant at a much higher concentration than can be stably attained with zinc in InP.

The high doping concentration attainable in the low-diffusivity p-type semi-conductor material minimizes the extension of the depletion region into the p-type cladding layer. Minimizing the extension of the depletion region into the p-type cladding layer increases the strength of the electric field applied across the quantum wells by a given reverse bias voltage. This in turn increases the extinction ratio of the electroabsorption modulator at that reverse bias voltage. The electroabsorption modulator in accordance with the invention has an extinction ratio that is substantially higher than in an otherwise similar conventional electroabsorption modulator.

Figure 2:
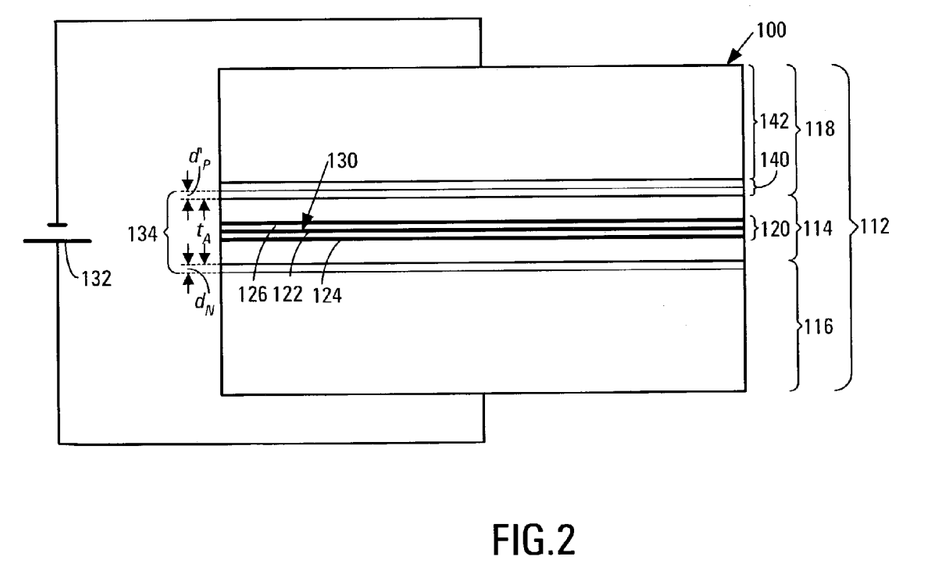
FIG. 2 is a schematic diagram of a first exemplary embodiment of an electroabsorption modulator in accordance with the invention.

FIG. 2 is a schematic diagram illustrating an example of a first embodiment 100 of an electroabsorption modulator in accordance with the invention. The electroabsorption modulator 100 is composed of a heterostructure p-i-n junction structure 112. The p-i-n junction structure is composed of an active layer 114 sandwiched between an n-type cladding layer 116 and a p-type cladding layer 118.

N-type cladding layer 116 is doped with a donor (n-type) dopant. P-type cladding layer 118 is doped with an acceptor (p-type) dopant. No dopant is added to the semiconductor material of active layer 114 during fabrication of the active layer, so the semiconductor material of the active layer is n-type with a donor concentration below about $10^{16}$ atoms cm$^{-3}$.

Located at approximately the mid-point of the thickness of active layer 114 is a quantum well structure 120. The quantum well structure is composed of N quantum well layers of a semiconductor material having a relatively low band gap energy. N is an integer greater than or equal to unity. The quantum well layers are interleaved with N+1 barrier layers of a semiconductor material having a band-gap energy greater than that of the semiconductor material of the quantum well layers. An exemplary quantum well layer is shown at 122. Exemplary barrier layers between which quantum well layer 122 is located are shown at 124 and 126. The layers of the quantum well structure are typically only a few nanometers thick. The outermost barrier layers may be thicker. A quantum well exists at each quantum well layer. The quantum well defined by quantum well layer 122 and barrier layers 124 and 126 is shown at 130.

The quantum wells defined by quantum well structure 120 are structured to absorb light of a defined wavelength when the p-i-n junction structure 112 of electroabsorption modulator 100 is reversed biased by a reverse bias voltage applied by a voltage source 132. The photons of the light have sufficient energy to create excitons in the quantum well and are therefore absorbed, as will be described more fully below.

In electroabsorption modulator 100, p-type cladding layer 118 is composed of a layer 140 of low-diffusivity p-type semiconductor material and a layer 142 of p-type semiconductor material. Layer 140 is located adjacent active layer 114 and layer 142 is located adjacent layer 140 on the side of layer 140 remote from the active layer.

In p-i-n junction structure 112 of the exemplary embodiment shown, the semiconductor material of n-type cladding layer 116 is InP and the materials of the layers constituting active layer 114 are various formulations of indium gallium arsenide phosphide (InGaAsP). The low-diffusivity p-type semiconductor material of layer 140 has a band gap energy sufficiently high to ensure that layer 140 does not absorb the light that is to be modulated by electroabsorption modulator 100. Semiconductor material with a bandgap energy of greater than about 1 eV does not absorb light in a wavelength range centered at about 1.55 μm. The low-diffusivity p-type semiconductor material of layer 140 is also substantially lattice matched to InP. The low-diffusivity p-type semiconductor material of layer 140 is low diffusivity in the sense that it is capable of being stably doped with an acceptor dopant to a substantially higher doping concentration than the maximum stable doping concentration of zinc in indium phosphide (InP). The low diffusivity of the low-diffusivity p-type semiconductor material prevents p-type dopant from migrating from layer 140 into active layer 114 where its presence is undesirable.

In an exemplary embodiment, the heavily-doped low-diffusivity p-type semiconductor material of layer 140 is aluminum indium arsenide (AlInAs) doped with carbon. In one embodiment, the AlInAs is lattice matched to InP and has an aluminum fraction of about 0.48. The lattice mismatch resulting from the aluminum fraction varying between about 0.44 and 0.52 can be tolerated in a layer 140 having a thickness at or near the minimum of the thickness range described below. In an alternative embodiment, the heavily-doped low diffusivity p-type semiconductor material is aluminum gallium indium arsenide (AlGaInAs) doped with carbon and having an aluminum fraction greater than about 0.5. The semiconductor material of layer 142, which constitutes the remainder of p-type cladding layer 118, is InP doped with zinc.

The InP of n-type cladding layer 116 is doped with silicon at as high a doping concentration as possible to minimize the extension of depletion region 134 into the n-type cladding layer when a reverse bias voltage is applied to electroabsorption modulator 100. A doping concentration of about $1 \times 10^{19}$ atoms cm$^{-3}$ is typical, as described above.

The heavily-doped low-diffusivity p-type semiconductor material of layer 140 of p-type cladding layer 118 is doped with carbon at a doping concentration similar to that of the silicon dopant in the n-type cladding layer 116. The low-diffusivity p-type semiconductor material is a material capable of being stably doped at such a high doping concentration. In an example in which the low-diffusivity p-type semiconductor material is AlInAs, a hole concentration as high as about $4 \times 10^{19}$ cm$^{-3}$ is stably attainable by doping this material with carbon.

The doping concentration of the p-type semiconductor material of layer 142 that constitutes the remainder of p-type cladding layer 118 is about an order of magnitude lower than that of the low-diffusivity p-type semiconductor material of layer 140. The InP of layer 142 of the p-type cladding layer is doped with zinc at a concentration below that at which out-diffusion of the dopant becomes a concern, i.e., typically less than $1 \times 10^{18}$ atoms cm$^{-3}$.

The high doping concentration of the heavily-doped low-diffusivity p-type semiconductor material of layer 140 significantly reduces the extension of depletion region 134 into p-type cladding layer 118 when voltage source 134 applies a reverse bias voltage to p-i-n junction structure 112 compared with a conventional p-type cladding layer composed entirely of InP. The reduced extension of the depletion region into the p-type cladding layer is indicated by the distance $d_P'$ in FIG. 2. The reduced extension of the depletion region into p-type cladding layer 118 increases the strength of the electric field applied by a given reverse bias voltage across the quantum wells defined by quantum well structure 120 compared with an otherwise similar conventional electroabsorption modulator. The increased strength of the electric field causes electroabsorption modulator 100 in accordance with the invention to have a higher extinction ratio than an otherwise similar conventional electroabsorption modulator.

In some embodiments, the thickness of layer 140 of the low-diffusivity p-type semiconductor material need not be significantly greater than the extension of the depletion region into the p-type cladding layer 118 at the maximum specified reverse bias. The thickness of the layer 140 is typically in the range from about 20 nm to about 100 nm. Thickness at the low end of this range is less than the critical thickness of a number of semiconductor materials that have a bulk lattice constant different from that of InP. Thin layers of such semiconductor materials, i.e., layers thinner than the critical thickness, can be grown on lattice matched to InP with good crystalline quality.

In another embodiment, layer 140 of low-diffusivity p-type semiconductor material constitutes the entire p-type cladding layer 118. Such embodiment lacks the layer 142. In all embodiments, the p-type cladding layer has to be thick enough to isolate the evanescent field of the light in active layer 114 from the metal layer (not shown) located on the surface of the p-type cladding layer remote from the active layer. Hence, in an embodiment in which layer 140 constitutes the entire p-type cladding layer, the low-diffusivity p-type semiconductor material should have a lattice constant that closely matches that of InP so that layer 140 can be grown to the requisite thickness with acceptable crystalline quality, and should have a lower refractive index than active layer 114 to enable it to function as the cladding layer of an optical waveguide having the active layer as its core.

Figure 3A:
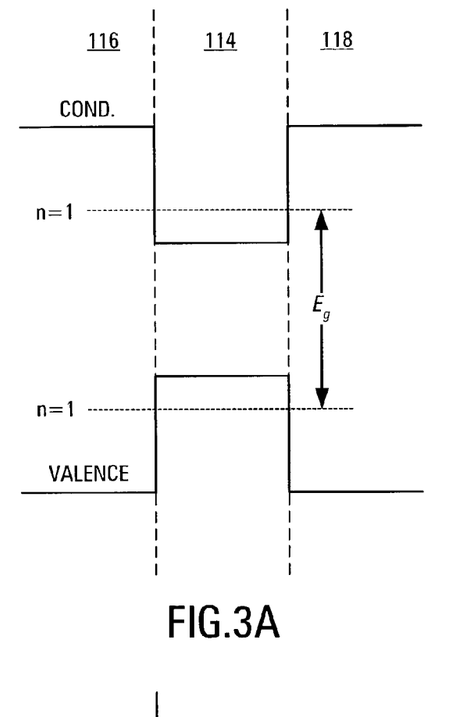
FIG. 3A is an energy diagram illustrating the energy gap between the conduction and valence energy bands of an embodiment of an electroabsorption modulator in accordance with the invention with no electric field applied.
Figure 3B:
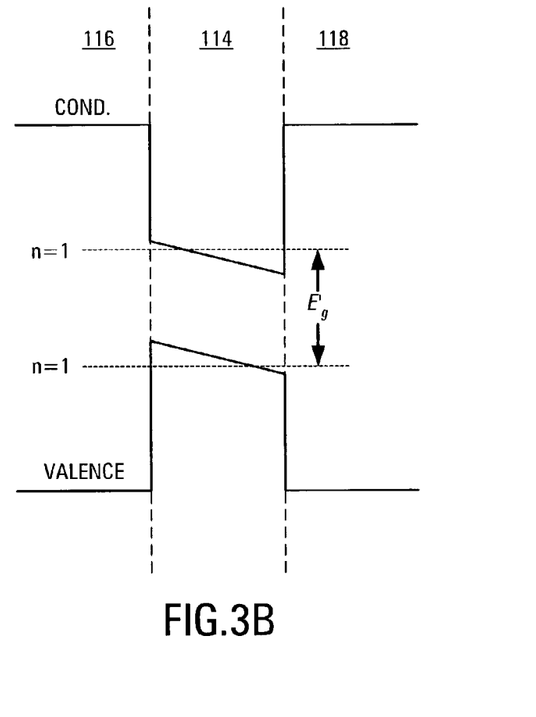
FIG. 3B is an energy diagram illustrating the energy gap between the conduction and valence energy bands of an embodiment of an electroabsorption modulator in accordance with the invention with an electric field applied.

FIGS. 3A and 3B are energy diagrams that illustrate how the quantum-confined Stark effect reduces the effective band gap energy of the quantum wells of electroabsorption modulator 100 when an electric field is applied across the quantum wells. In particular, FIGS. 3A and 3B illustrate the dependence of the change in the effective band gap on the strength of the electric field applied to the quantum wells.

FIGS. 3A and 3B illustrate the line-up of the conduction band and the valence band of quantum well 130 defined by quantum well layer 122 and barrier layers 124 and 126 in quantum well structure 120. FIG. 3A illustrates the band line-up with no reverse bias voltage applied to electroabsorption modulator 100 and, hence, no electric field applied across quantum well 130. With no electric field applied across the quantum well, the energies of the conduction band and the valence band are constant across the thicknesses of quantum well layer 122 and barrier layers 124 and 126. The energy gap for a transition between the lowest energy subbands (n=1) of an electron in the conduction band and a heavy hole in the valence band is indicated by $E_g$.

FIG. 3B illustrates the band line-up with a reverse bias voltage applied to electroabsorption modulator 100 and, hence, an electric field applied across quantum well 130 in a direction orthogonal to the layers of quantum well structure 120. A reverse bias voltage is applied to the electroabsorption modulator by setting n-type cladding layer 116 to a more positive voltage than p-type cladding layer 118.

The applied electric field tilts the energy levels of the valence and conduction bands so that the energy levels are no longer constant across the thicknesses of quantum well layer 122 and barrier layers 124 and 126. Instead, the energy levels vary substantially linearly through the thickness of the layers. The tilted energy levels form a tilted quantum well that has an energy gap $E_g'$ for a transition between the lowest-energy subbands (n=1) of an electron in the conduction band and a heavy hole in the valence band. The energy gap $E_g'$ is smaller in magnitude than the energy gap $E_g$ in the absence of an electric field, as shown in FIG. 3A. The smaller energy gap is the result of a reduction in the electron subband (n=1) energy level and an increase in the heavy-hole subband (n=1) energy level.

The change in the energy gap between $E_g$ and $E_g'$ is directly proportional to the strength of the electric field applied across quantum well 130. Thus, any increase in the strength of the electric field across the quantum well for a given reverse bias voltage will increase the difference between the without-field energy gap $E_g$ and the with-field energy gap $E_g'$, and will consequently increase the quantum-confined Stark effect on the quantum well.

The strength E of the electric field applied across quantum well 130 for a given reverse-bias voltage $V_R$ applied to electroabsorption modulator 100 is calculated by dividing the reverse-bias voltage by the thickness of depletion region 134, i.e.:

$$E = \frac{V_R}{t_A + d_N + d_P} \quad (1)$$

where $t_A$ is the thickness of active region 114, $d_N$ is the distance depletion region 134 extends into n-type cladding layer 116 and $d_P$ is the distance the depletion region extends into p-type cladding layer 118, both when electroabsorption modulator 100 is reverse biased.

Equation 1 shows that any reduction in the distances $d_N$ and $d_P$ that depletion region 134 extends into n-type cladding layer 116 and p-type cladding layer 118, respectively, will increase the strength E of the electric field for a given reverse-bias voltage. Layer 140 of low-diffusivity p-type semiconductor material significantly reduces the distance $d_P$, as described above, and therefore increases the strength of the electric field E for a given applied reverse bias voltage. Increasing the electric field increases the quantum-confined Stark effect to which the quantum well is subject. As will be described below, increases the quantum-confined Stark effect increases light absorption by the quantum well. Consequently, layer 140 of low-diffusivity p-type semiconductor material decreasing the distance $d_P$ increases the light absorption, and, hence, the extinction ratio, of electroabsorption modulator 100. Additionally or alternatively, at least some of the increase light absorption may be traded for an increase in the modulation.

Figure 4:
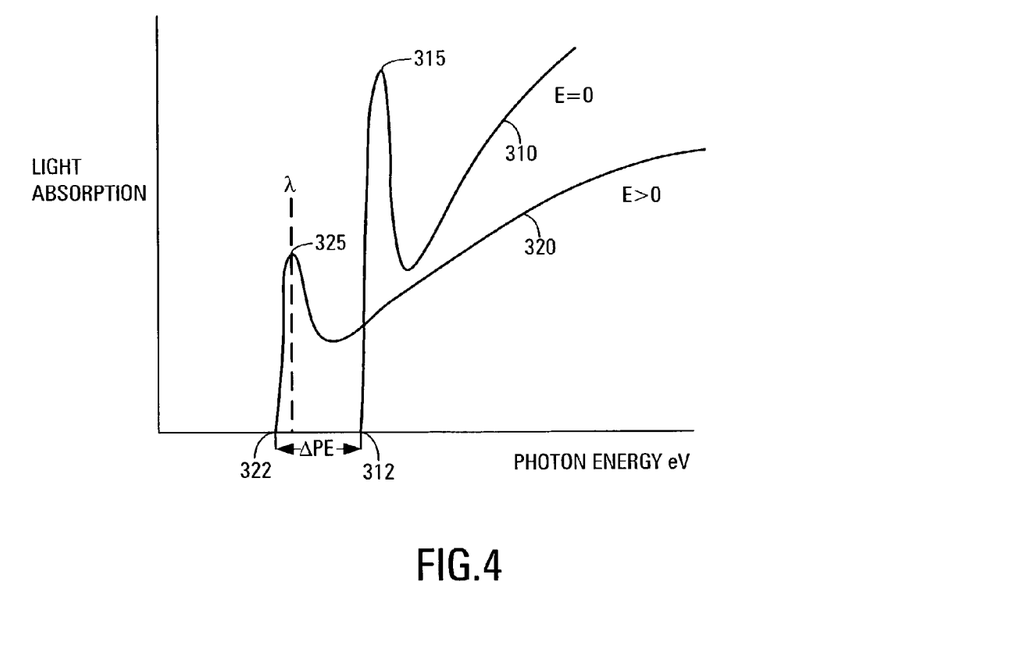
FIG. 4 is a graph showing the absorption spectrum of an embodiment of an electroabsorption modulator in accordance with the invention in an unbiased and a reverse biased state.

FIG. 4 is a graph that illustrates the absorption spectrum of an embodiment of electroabsorption modulator 100 in accordance with the invention light absorption. In FIG. 4, light absorption is plotted as ordinate and photon energy is plotted as abscissa. Curve 310 shows the absorption spectrum in the absence of a reverse bias.

Among the mechanisms by which the quantum wells may absorb light, a photon of sufficient energy may raise an electron from a sub-band of the valence band to a vacant state in the conduction band to create a free electron-hole pair. Alternatively, a photon of energy slightly lower than the bandgap may be absorbed to create a bound electron-hole pair, i.e., an exciton. Hence, the overall absorption spectrum represented by curve 310 consists of a superposition of the band-to-band absorption spectrum with the exciton absorption spectrum. The absorption spectrum represented by curve 310 exhibits a threshold photon energy 312. Photon energies below threshold photon energy 312 are insufficient generate any excitons. The threshold photon energy is slightly less than the energy gap $E_g$ shown in FIG. 3A. As the photon energy increases above the threshold 312, the absorption exhibits a resonance due to exciton production: the absorption sharply increases to a maximum, indicated at 315, and then falls back to a lower level. As the photon energy increases further, the absorption increases more progressively.

Curve 320 shows the absorption spectrum of electroabsorption modulator 100 with a reverse-bias voltage applied. With a reverse bias voltage applied to the electroabsorption modulator, the electric field applied to the quantum wells is greater than zero. Applying an electric field to the quantum wells reduces the energy gap from $E_g$ shown in FIG. 3A to $E_g'$ shown in FIG. 3B. Curve 320 demonstrates the quantum-confined Stark effect that results from the application of an electric field.

With the electric field applied, the reduced energy gap $E_g'$ reduces the threshold photon energy at which the photon energy is sufficient to generate excitons to the threshold energy 322. The threshold photon energy is slightly less than the energy gap Eg' shown in FIG. 3B. As the photon energy increases above the threshold energy 322, the absorption characteristic exhibits a resonance due to exciton production: the absorption sharply increases to a maximum, indicated at 325, and then falls back to a lower level. As the photon energy increases further, the absorption increases more progressively. The resonance is less sharp and the maximum exciton generation rate is less with the electric field applied than in the absence of the electric field because the exciton generation is less efficient. This is due to the spatial offset between the location of the heavy hole wave function in the higher-energy portion of valence band and the location of the electron wave function in the lower-energy portion of the conduction band.

The change ΔPE between the threshold photon energies 312 and 322 resulting from applying a reverse bias voltage to electroabsorption modulator 100 depends on the strength of the electric field applied to the quantum wells. Increasing the strength of the electric field applied across the quantum wells increases the change in the threshold photon energy for a given reverse-bias voltage applied to electroabsorption modulator 100.

Electroabsorption modulator 100 is structured and the magnitude of the reverse bias voltage is selected so that the resonance 325 of the exciton generation curve 320 is changed to a photon energy corresponding to the wavelength λ of the light that is to be modulated by the electroabsorption modulator. With such an embodiment, when the reverse bias voltage is applied to the electroabsorption modulator, exciton generation and, hence, absorption of the light is a maximum. The photon energy of the light of wavelength λ is below the threshold photon energy 312 in the absence of the reverse-bias voltage. Hence, when the reverse-bias voltage is removed, the threshold photon energy changes to threshold photon energy 312, and electroabsorption modulator 100 absorbs less of the light.

In practical electroabsorption modulators, the absorption edges are not as ideally sharp as those shown in FIG. 4. In the absence of the reverse bias, the electroabsorption modulator is not as perfectly transparent as shown. With the reverse bias applied, the electroabsorption modulator does not completely absorb the light. Practical electroabsorption modulators are therefore characterized by an extinction ratio, as noted above. A good electroabsorption modulator provides a large extinction ratio for a small reverse bias voltage, and can be switched rapidly with minimal transients. A given electroabsorption modulator meets the above-stated performance criteria over only a relatively narrow range of wavelengths.

Figure 5:
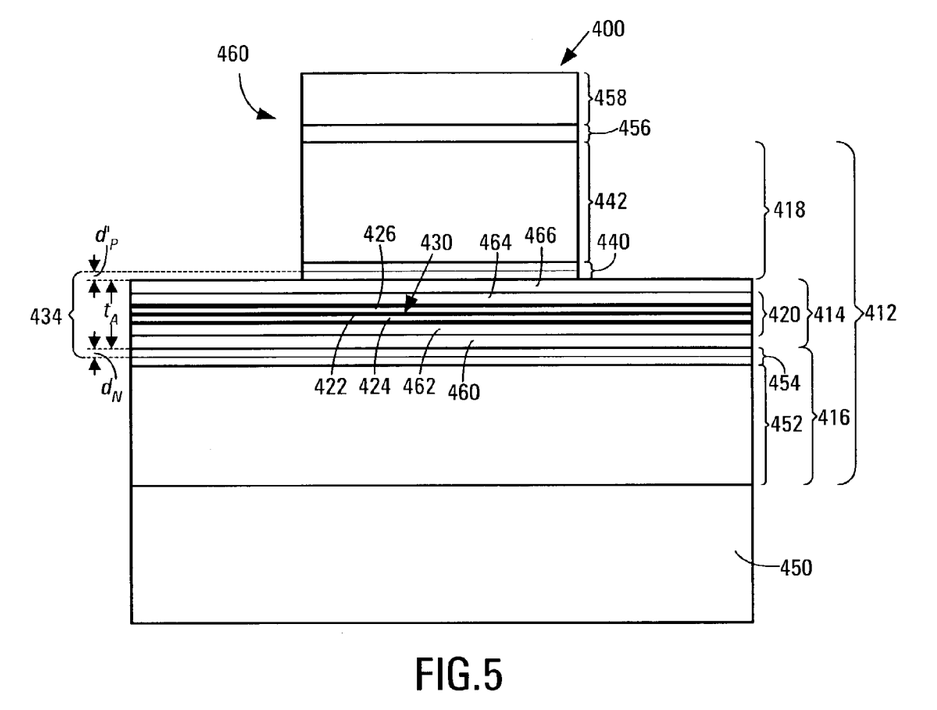
FIG. 5 is a schematic diagram of a second embodiment of an electroabsorption modulator in accordance with the invention.

FIG. 5 is a schematic diagram of a second embodiment 400 of an electroabsorption modulator that incorporates a layer of low-diffusivity p-type semiconductor material in accordance with the invention. The electroabsorption modulator 400 is composed of a substrate 450 on which are located an n-type cladding layer 416 and, in order of increasing distance from the substrate, an active region 414 and a p-type cladding layer 418. The p-type cladding layer includes a layer 440 of a low-diffusivity p-type semiconductor material located adjacent the active region 414.

N-type cladding layer 416 is composed of a moderately-doped layer 452 adjacent substrate 450 and a highly-doped layer 454 adjacent active layer 414.

P-type cladding layer 418 is composed of a layer 440 of low-diffusivity p-type semiconductor material and a layer 442 of p-type semiconductor material, which accounts for the remainder of the thickness of the p-type cladding layer. Located on the surface of the p-type cladding layer remote from active layer 414 are contact layers 456 and 458.

Located at approximately the mid-point of the thickness of active layer 414 is quantum well structure 420. The quantum well structure is composed of nine quantum well layers of a semiconductor material having a relatively low band gap energy interleaved with eight inner barrier layers and two outer barrier layers of a semiconductor material having a band-gap energy greater than that of the semiconductor material of the quantum well layers. Only three of the quantum well layers and two of the inner barrier layers are shown in FIG. 5 to simplify the drawing. Both outer barrier layers are shown at 462 and 464. An exemplary quantum well layer is shown at 422. Exemplary inner barrier layers between which quantum well layer 422 is located are shown at 424 and 426. The quantum well defined by quantum well layer 422 and barrier layers 424 and 426 is shown at 430.

In active layer 414, quantum well structure 420 is separated from n-type cladding layer 416 by a waveguide layer 460 and is separated from p-type cladding layer 418 by a waveguide layer 466.

In the example shown, the material of substrate 450 is n-type InP, i.e., InP doped with Si. N-type cladding layer 416 is an approximately 2 μm-thick layer of n-type InP. Heavily-doped layer 454 is approximately 60 nm thick. The n-type InP of the n-type cladding layer is doped with Si in moderately-doped layer 452 and is heavily doped with Si in heavily-doped layer 454. The high doping concentration in the heavily-doped layer reduces the extension $d_N$ of depletion region 434 into the n-type cladding layer when the reverse bias voltage is applied to electroabsorption modulator 400. Since the extension of the depletion region is small and is confined to the heavily-doped layer, the doping concentration in moderately-doped layer 452, which constitutes the remainder of the n-type cladding layer, can be lower.

The semiconductor materials of the layers that constitute active layer 414 are various formulations of indium gallium arsenide phosphide (InGaAsP). Each such semiconductor material will be characterized by the band gap energy of the material expressed in terms of the wavelength of the light having a photon energy that corresponds to the bandgap energy of the material. For example, a semiconductor material referred to as 1.05 μm InGaAsP is InGaAsP formulated to have a band gap energy corresponding to the photon energy of light having a wavelength of 1.05 μm. The band gap energy of the material not only depends on the formulation of the material, i.e., the fractions of In, Ga, As and P in the material, but also depends on the strain to which the layer of the material is subject. No dopant is added to the semiconductor materials of the active layer during fabrication, as noted above.

In active layer 414, waveguide layer 460 and waveguide layer 466 are each an approximately 42 nm-thick layer of 1.05 μm InGaAsP. In quantum well structure 420, outer barrier layer 462 and outer barrier layer 464 are each an approximately 42 nm-thick layer of 1.15 μm InGaAsP, each quantum well layer 422 is an approximately 8.5 nm-thick layer of 1.65 μm InGaAsP, and each inner barrier layer 464 is an approximately 8.0 nm-thick layer of 1.2 μm InGaAsP. The InGaAsP of the quantum well layers is compressively strained with respect to InP and the InGaAsP of the barrier layers is tensile strained with respect to InP. Active layer 414 thus has a total thickness of approximately 300 nm to reduce the capacitance and, hence, increase the modulation speed, of electroabsorption modulator 400.

In p-type cladding layer 418, the low-diffusivity p-type semiconductor material of layer 440 is p-type AlInAs having an aluminum fraction of about 0.48. With this aluminum fraction, AlInAs is lattice matched to InP. Other aluminum fractions in the range from about 0.44 to 0.52 can alternatively be used and will grow on InGaAsP with acceptable crystalline quality. The low-diffusivity p-type semiconductor material of layer 440 is heavily doped with carbon to provide a hole concentration of approximately $4 \times 10^{19}$ cm$^{-3}$. The low-diffusivity p-type semiconductor material of layer 440 may additionally include gallium, as described above. Layer 440 ranges in thickness from about 20 nm to about 100 nm. The high doping concentration in layer 440 reduces the extension $d_P$ of depletion region 434 into the p-type cladding layer when the reverse bias voltage is applied to electroabsorption modulator 400.

Layer 442 is an approximately 2.4 μm-thick layer of InP doped p-type with zinc at a dopant concentration in the range from about $5 \times 10^{17}$ atoms cm$^{-3}$ to about $9 \times 10^{17}$ atoms cm$^{-3}$, i.e., below the above-described solubility limit of zinc in InP. Contact layer 456 is an approximately 25 nm-thick layer of 1.2 μm InGaAsP doped p-type with zinc at a dopant concentration greater than about $1 \times 10^{19}$ cm$^{-3}$. Contact layer 458 is an approximately 100 nm-thick layer of InGaAs doped p-type with zinc at a dopant concentration of greater than about $1 \times 10^{19}$ cm$^{-3}$.

In other embodiments, the thicknesses and dopant concentrations differ from those stated above.

A batch of electroabsorption modulators 400 is fabricated as follows. A layer structure from which many electroabsorption modulators are fabricated is grown on a wafer of n-type InP. The layer structure includes layers corresponding to the layers of electroabsorption modulator 400 described above with reference to FIG. 5, i.e., layers corresponding to, in order, n-type cladding layer 416, including moderately-doped layer 452 and highly-doped layer 454; active layer 414, including waveguide layer 460, outer barrier layer 462, nine quantum well layers interleaved with eight inner barrier layers, outer barrier layer 464 and waveguide layer 466; p-type cladding layer 418, including layer 440 of low-diffusivity p-type semiconductor material and layer 442; and contact layers 456 and 458. The layers are grown by a suitable epitaxial growth process such as MOCVD or MBE. The materials and thicknesses of the layers constituting are described above.

The completed layer structure is then removed from the epitaxy reactor, a mask layer (not shown) is deposited on the exposed surface of the layer structure and the mask layer is patterned to form an etch mask that defines ridge structure 460. The part of the layer structure not protected by the etch mask is etched as far as active layer 414 to form the ridge structure. Alternatively, the part of the layer structure not protected by the etch mask may be etched as far as layer 440 of low-diffusivity p-type semiconductor material. The etch may be performed using a dry etch process or a wet etch process.

A layer of metal (not shown) is deposited on each of the opposed major surfaces of the layer structure for form electrodes that electrically contact substrate 450 and contact layer 458. An antireflection coating (not shown) is applied to each of the end facets (not shown, but parallel to the plane of the drawing) of the electroabsorption modulator. The layer structure (not shown) is then divided into individual electroabsorption modulators each having a structure similar to that of electroabsorption modulator 400. An antireflection coating (not shown) is applied to each of the end facets (not shown, but parallel to the plane of the drawing) of each electroabsorption modulator. Electroabsorption modulator 100 described above with reference to FIG. 2 may be fabricated in a similar way.

Ridge structure 460 provides lateral confinement of light passing through active layer 414 the direction orthogonal to the plane of the drawing. Lateral confinement may alternatively be provided by a buried heterostructure, or by some other structure that provides lateral confinement.

In the embodiments described above, layers 140 and 440 of low diffusivity p-type semiconductor material provide benefits in addition to reducing the extension of depletion region 134 or 434 into p-type cladding layer 118 or 418, as described above. Examples of such additional benefits will now be described with reference to layer 440. Similar benefits are provided by layer 140. Layer 440 prevents zinc from diffusing from layer 442 of p-type cladding layer 418 into active region 414. This is because the solubility of zinc in the heavily-doped low-diffusivity p-type semiconductor material of layer 440 is greater than in an InP material. Also, since the heavily-doped low-diffusivity p-type semiconductor material of layer 440 has a high doping concentration and a high bandgap energy, it has a large conduction band offset relative to InP. This large conduction band offset allows layer 440 to confine electrons to the active region. This property is advantageous especially in electroabsorption modulators having a thinner active region that are designed for lower speed operation, e.g., at modulation rates of about 10 Gb/s and below.

Figure 6:
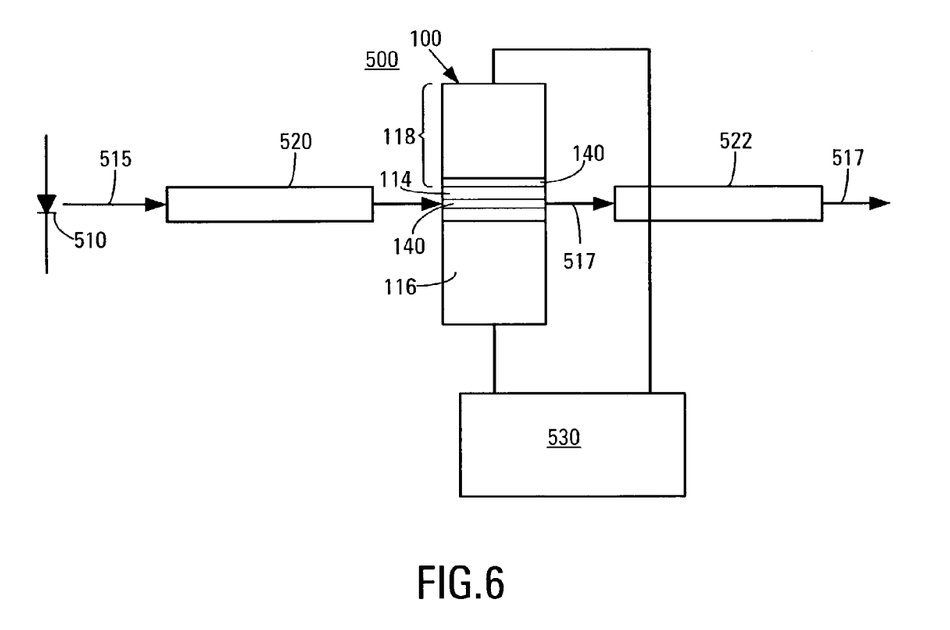
FIG. 6 is a schematic diagram of a system for modulating light in accordance with the invention incorporating an embodiment of an electroabsorption modulator in accordance with the invention.

FIG. 6 is a block diagram of a system 500 for modulating light based on an embodiment of electroabsorption modulator 100 described above with reference to FIG. 2. The system 500 may alternatively incorporate the electroabsorption modulator 400 described above with reference to FIG. 5. System 500 is composed of a light source 510, a waveguide 520 arranged to receive light 515 generated by light source 510 and electroabsorption modulator 100 arranged to receive light 515 from waveguide 520. In an embodiment, the elements just described are fabricated in a single semiconductor device. Waveguide 520 may be a ridge waveguide, a buried heterostructure waveguide or another type of optical waveguide. Alternatively, waveguide 520 may be an optical fiber. Lenses and other optical elements (not shown) may optionally be located between light source 510 and optical waveguide 520 and between optical waveguide 520 and electroabsorption modulator 100.

Light source 510 generates light 515 at a constant intensity and at a specified wavelength. The light source emits at least part of light 515 into waveguide 520.

Waveguide 520 guides light 515 towards electroabsorption modulator 100, and specifically, towards active region 114. The light passes from the waveguide into the electroabsorption modulator, and propagates through the active region of the electroabsorption modulator in a direction parallel to the layers of quantum well structure 120. Modulated light 517 output by electroabsorption modulator 100 passes into waveguide 522 for onward transmission.

FIG. 6 depicts light 515 propagating parallel to the layers of quantum well structure 120. However, light 515 may alternatively propagate in a direction orthogonal to the layers of the quantum well structure, although electroabsorption modulator 100 would have a lower extinction ratio when operated this way.

In the p-type cladding layer 118 of electroabsorption modulator 100, layer 140 of heavily-doped low-diffusivity p-type semiconductor material reduces the extension of the depletion region into the p-type cladding layer. This increases the strength of the electric field applied to the quantum wells defined by quantum well structure 120 for a given reverse bias voltage applied by modulation signal generator 530. The increased strength of the electric field increases the extinction ratio of the electroabsorption modulator for a given reverse bias voltage.

Electroabsorption modulator 100 is structured and the reverse bias voltage provided by modulation signal generator 530 is set such that the wavelength of light 515 output by light source 510 is at the resonant frequency of exciton formation in electroabsorption modulator 100 with the reverse bias voltage applied. This maximizes absorption of light 515 when the modulation signal generator applies the reverse bias voltage. With no reverse bias voltage applied, the electroabsorption modulator is transparent to light 515, and light 515 passes through the electroabsorption modulator with little attenuation as modulated light 517.

This disclosure describes the invention in detail using illustrative embodiments. However, it is to be understood that the invention defined by the appended claims is not limited to the precise embodiments described.

We claim:

1. An electroabsorption modulator, comprising:
   a p-i-n junction structure comprising an active layer, a p-type cladding layer and an n-type cladding layer, the active layer sandwiched between the cladding layers; and
   a quantum well structure located within said active layer; in which:
   said p-type cladding layer comprising:
      a first layer of heavily-doped low-diffusivity p-type semiconductor material, wherein said first layer is located directly adjacent said active layer; and
      a second layer of p-type semiconductor material located adjacent said first layer and on a side of said first layer remote from said active layer, wherein a first acceptor dopant of said first layer has a higher first doping concentration than a second doping concentration of said second acceptor dopant in said second layer.

2. The electroabsorption modulator of claim 1, in which said heavily-doped low-diffusivity p-type semiconductor material comprises aluminum, indium and arsenic and is doped with said first acceptor dopant comprising carbon.

3. The electroabsorption modulator of claim 2, in which said first acceptor dopant has said first doping concentration of at least $2 \times 10^{18}$ atoms per cubic centimeter.

4. The electroabsorption modulator of claim 3, in which said first acceptor dopant provides a hole concentration of greater than about $1 \times 10^{19}$ per cubic centimeter.

5. The electroabsorption modulator of claim 3, in which said first acceptor dopant provides a hole concentration of about $4 \times 10^{19}$ per cubic centimeter.

6. The electroabsorption modulator of claim 2, in which said heavily-doped low-diffusivity p-type semiconductor material additionally comprises gallium.

7. The electroabsorption modulator of claim 6, in which said first acceptor dopant has said first doping concentration of at least $2 \times 10^{18}$ atoms per cubic centimeter.

8. The electroabsorption modulator of claim 6, in which said first acceptor dopant provides a hole concentration of greater than about $1 \times 10^{19}$ per cubic centimeter.

9. The electroabsorption modulator of claim 6, in which said first acceptor dopant provides a hole concentration of about $4 \times 10^{19}$ per cubic centimeter.

10. The electroabsorption modulator of claim 1, in which said first layer of heavily-doped low-diffusivity p-type semiconductor material constitutes the entire p-type cladding layer.

11. The electroabsorption modulator of claim 1, in which said p-type cladding layer additionally comprises said second layer of p-type semiconductor material comprising indium and phosphorus and doped with said second acceptor dopant comprising zinc.

12. The electroabsorption modulator of claim 1, in which said heavily-doped low-diffusivity p-type semiconductor material is lattice matched to the adjacent material of said active layer.

13. The electroabsorption modulator of claim 1, in which said first layer of said heavily-doped low-diffusivity p-type semiconductor material has a thickness in the range between about 2 nanometers and about 100 nanometers.

14. An electroabsorption modulator, comprising:
   a p-i-n junction structure comprising an active layer, a p-type cladding layer and an n-type cladding layer, the active layer sandwiched between the cladding layers; and a quantum well structure located within said active layer; in which:

said p-type cladding layer comprises a layer of heavily-doped low-diffusivity p-type semiconductor material located adjacent said active layer; and the depletion region existing in said electroabsorption modulator under reverse bias is confined to said layer of said heavily-doped low-diffusivity p-type semiconductor material, said confinement increasing the extinction ratio of said electroabsorption modulator.

15. The electroabsorption modulator of claim 1, in which said heavily-doped low-diffusivity p-type semiconductor material has a bandgap energy of at least 0.85 eV.

16. The electroabsorption modulator of claim 1, in which said n-type cladding layer comprises a layer of highly-doped n-type semiconductor material adjacent said active layer.

17. The electroabsorption modulator of claim 1, in which:

said second layer in said p-type cladding layer comprises indium and phosphorus; and said heavily-doped low-diffusivity p-type semiconductor material has said first doping concentration higher than the maximum stably-attainable second doping concentration of zinc in indium phosphide.

18. An electroabsorption modulator, comprising:

a p-i-n junction structure comprising an active layer, a p-type cladding layer and an n-type cladding layer, the active layer sandwiched between the cladding layers; and a quantum well structure located within said active layer; in which:

said p-type cladding layer comprises a layer of heavily-doped low-diffusivity p-type semiconductor material located adjacent said active layer; and said layer of said heavily-doped low-diffusivity p-type semiconductor material located adjacent said active layer reduces extension into said p-type cladding layer of a depletion layer existing in said electroabsorption modulator under reverse bias.

19. An electroabsorption modulation system, comprising:

an electroabsorption modulator;

a light source; and a waveguide arranged to couple light from said light source to said electroabsorption modulator; in which:

said electroabsorption modulator comprises a p-i-n junction structure comprising a p-type cladding layer, an n-type cladding layer and an active layer sandwiched therebetween, said p-type cladding layer comprising:

a first layer of heavily-doped lowdiffusivity p-type semiconductor material, wherein said first layer is located directly adjacent said active region; and a second layer of p-type semiconductor material located adjacent said first layer and on a side of said first layer remote from said active layer, wherein a first acceptor dopant of said first layer has a higher first doping concentration than a second doping concentration of said second acceptor dopant in said second layer.

20. The electroabsorption modulation system of claim 19, in which said heavily-doped low-diffusivity p-type semiconductor material comprises aluminum, indium and arsenic and said first acceptor dopant comprising carbon.

21. The electroabsorption modulation system of claim 20, in which said heavily-doped low-diffusivity p-type semiconductor material additionally comprises gallium.

* * * * *

UNITED STATES PATENT AND TRADEMARK OFFICE
CERTIFICATE OF CORRECTION

PATENT NO. : 7,142,342 B2
APPLICATION NO. : 10/453376
DATED : November 28, 2006
INVENTOR(S) : David P. Bour et al.

It is certified that error appears in the above-identified patent and that said Letters Patent is hereby corrected as shown below:

On the Title Page, Item (56) (U.S. Patent Documents), Line 2, delete "372/45" and insert -- 372/45.01 --;

Column 15, Line 15, Claim 16, delete "highly-doped" and insert -- heavily-doped --;

Column 16, Line 15, Claim 19, delete "lowdiffusivity" and insert -- low-diffusivity --.

Signed and Sealed this

Second Day of November, 2010

David J. Kappos
*Director of the United States Patent and Trademark Office*